(No Model.) 2 Sheets—Sheet 1.

W. BONNAR.
RUNNING GEAR.

No. 477,401. Patented June 21, 1892.

Witnesses
J. Edw. Maybee
W. G. McMillan

Inventor
William Bonnar
by Donald C. Ridout & Co.
Attys.

(No Model.) 2 Sheets—Sheet 2.

W. BONNAR.
RUNNING GEAR.

No. 477,401. Patented June 21, 1892.

Witnesses
J. Edw. Maybee
W. G. McMillan

Inventor
William Bonnar
by Donald C. Ridout & Co
Attys.

UNITED STATES PATENT OFFICE.

WILLIAM BONNAR, OF MONO MILLS, CANADA.

RUNNING-GEAR.

SPECIFICATION forming part of Letters Patent No. 477,401, dated June 21, 1892.

Application filed November 23, 1891. Serial No. 412,822. (No model.)

*To all whom it may concern:*

Be it known that I, WILLIAM BONNAR, of the village of Mono Mills, in the county of Peel, in the Province of Ontario, Canada, have invented a certain new and Improved Running-Gear, of which the following is a specification.

The object of the invention is to provide a light, strong, simple, and easy-running gear for vehicles; and it consists in the peculiar construction, arrangement, and combinations of parts hereinafter more particularly described and then definitely claimed.

Figure 1:
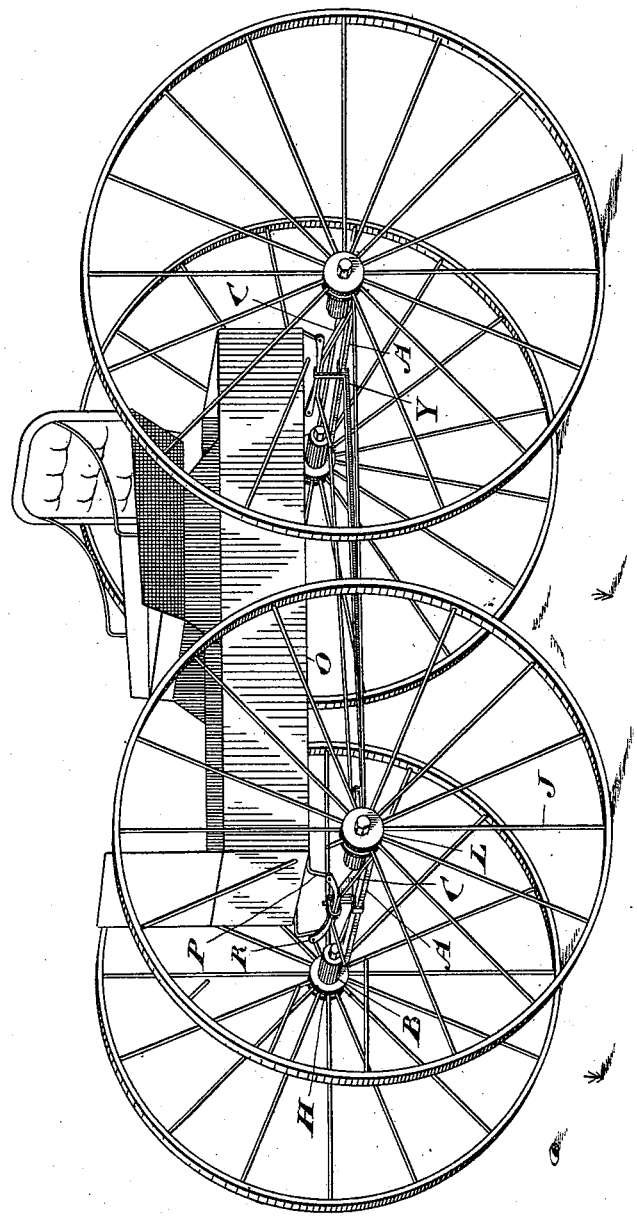
Figure 2:
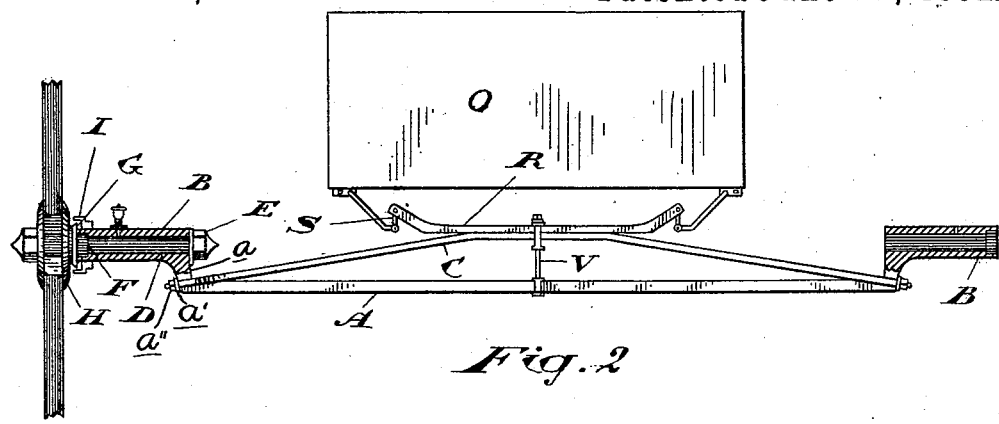
Figure 3:
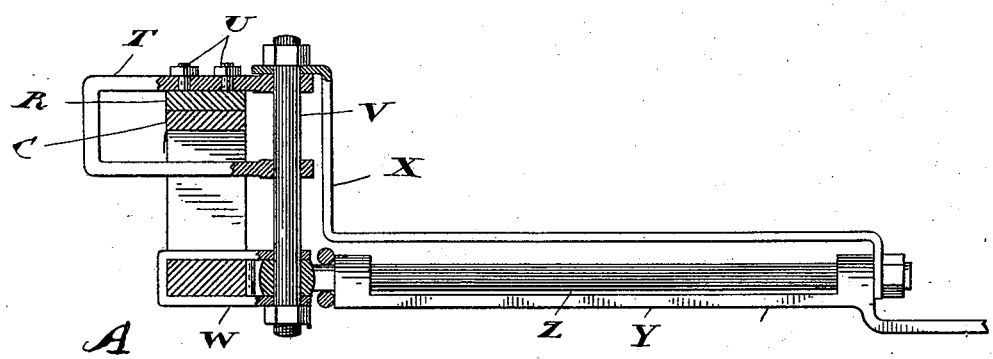

In the accompanying drawings, Figure 1 is a perspective view of a vehicle provided with my improved running-gear. Fig. 2 is an enlarged end view of the axle, springs, and body. Fig. 3 is an enlarged view showing the connection between the front axle and reach.

In the specification like letters of reference indicate corresponding parts in each figure.

A is the axle, on each end of which a bearing-box B is formed or otherwise attached, each bearing-box being set above the axle A, so as to keep the body of the vehicle as low as possible without decreasing the diameter of the wheels. Each axle A is made of light material, and in order to strengthen it, and at the same time carry the weight of the body to the extremity of the axle, I provide a brace or stay C, which forms a substantial truss, as shown in Fig. 2. This brace or truss C is forked at its ends and the neck $a$ at the end of the axle A fits in said forked end and is secured thereto by clip-bars $a'$ and nuts $a''$. Each bearing-box has a spindle D fitted into it, the said spindle being held in position by the nut and washer E. The outer end of the bearing-box B is recessed to receive a collar F, formed on the spindle D. A loose washer G is placed between the collar F and the disk H, which disk is shrunk on or otherwise rigidly fastened to the spindle D. An annular apron I is fixed to the outer end of the bearing-box B and extends over the washer G, so as to protect the same from dust and prevent the dust accumulating in the joint, and which might find its way into the bearing.

The bolster R, which is secured by suitable spring S to the body O, rests upon the brace C. A clip T (see Fig. 3) is secured to the bolster R by the studs U and projects behind the bolster, eyes being made in its ends, through which the king-bolt V passes, the lower end of the king-bolt V being held in position by the clip W, which is fixed to the axle A. The hammer-brace X is secured at one end to the top of the king-bolt V and extends back in the shape shown in Fig. 3 to the back of a bearing formed on the reach Y, where it fits over the rod or spindle Z, which spindle is carried in suitable bearings formed on the said reach, the front end of the spindle projecting between the jaws of the clip T and is journaled on the king-bolt V, as indicated in Fig. 3.

The construction described allows the front axle to swing horizontally or vertically, so that on going over uneven ground the running-gear is not subjected to any twisting strain.

What I claim as my invention is—

1. In a running-gear for vehicles, an axle A, having bearing-boxes B secured thereto above the same, a king-bolt V, and a truss or brace C, extending from the top of the king-bolt to the ends of the axle, thereby bracing the latter, substantially as described.

2. In a running-gear, an axle A, having bearing-boxes secured thereto by necks, and a truss or brace C, extending from the top of the king-bolt and having its ends forked to pass over the necks at the ends of the axle and secured to said necks by clip-bars and nuts, substantially as described.

3. In a running-gear for vehicles, an axle A, a truss or brace C, secured at its ends to the ends of the axle A, a bolster R, secured to the body of the vehicle, a clip T, secured to said bolster R, a clip W, passing over said axle A, and a king-bolt securing the clips V and W together, substantially as described.

4. The clip T, fixed to the bolster R, and the clip W, fixed to the axle A, and king-bolt V, journaled in the ends of the clips T and W, in combination with the hammer-brace X, reach Y, and rod or spindle Z, substantially as and for the purpose specified.

Toronto, October 10, 1891.

WILLIAM BONNAR.

In presence of—
I. EDW. MAYBEE,
W. G. MCMILLAN.